(12) United States Patent
Rausch (10) Patent No.: US 9,247,712 B2
(45) Date of Patent: Feb. 2, 2016

(54) SOW LACTATION FEEDER WITH ADJUSTABLE ACTUATOR

(71) Applicant: CTB, INC., Milford, IN (US)

(72) Inventor: Andrew J. Rausch, Rochester, IN (US)

(73) Assignee: CTB, Inc., Milford, IN (US)

( * ) Notice: Subject to any disclaimer, the term of this patent is extended or adjusted under 35 U.S.C. 154(b) by 113 days.

(21) Appl. No.: 14/229,192

(22) Filed: Mar. 28, 2014

(65) Prior Publication Data
US 2015/0272080 A1  Oct. 1, 2015

(51) Int. Cl.
*A01K 5/02* (2006.01)
*A01K 7/06* (2006.01)

(52) U.S. Cl.
CPC ............ *A01K 5/0233* (2013.01); *A01K 5/0241* (2013.01); *A01K 7/06* (2013.01)

(58) Field of Classification Search
CPC ...... A01K 5/0233; A01K 5/0241; A01K 7/06
USPC ......... 119/51.01, 53.5, 54, 53, 56.1, 75, 52.1, 119/71
See application file for complete search history.

(56) References Cited

U.S. PATENT DOCUMENTS

| | | | |
|---|---|---|---|
| 920,865 A | 5/1909 | Hannibal | |
| 1,587,775 A | 6/1926 | Higgins | |
| 3,019,765 A | 2/1962 | Malloy, Sr. | |
| 3,116,715 A | 1/1964 | Krumheuer | |
| 3,410,249 A | 11/1968 | Allen et al. | |
| 3,566,844 A | 3/1971 | Occhiodori et al. | |
| 3,688,743 A | 9/1972 | Rack et al. | |
| 3,782,334 A | 1/1974 | Leon et al. | |
| 3,812,823 A | 5/1974 | Ridder et al. | |
| 3,838,664 A | 10/1974 | Atchley | |
| 4,185,587 A | 1/1980 | Kallin | |
| 4,200,060 A | 4/1980 | Van Daele | |
| 4,348,988 A | 9/1982 | Lawson | |
| 4,633,816 A * | 1/1987 | Ove | A01K 7/06 119/72.5 |
| 4,779,571 A * | 10/1988 | Row | A01K 7/06 119/75 |

(Continued)

FOREIGN PATENT DOCUMENTS

| | | |
|---|---|---|
| DE | 3807980 A1 | 10/1988 |
| EP | 1716750 A1 | 11/2006 |

(Continued)

OTHER PUBLICATIONS

International Search Report and Written Opinion dated Jul. 13, 2015 in corresponding PCT Application No. PCT/US2015/022785.

(Continued)

*Primary Examiner* — Yvonne Abbott-Lewis
(74) *Attorney, Agent, or Firm* — Harness, Dickey (57) ABSTRACT

An on-demand feed actuator includes a sealing portion disposed within a feed reservoir and connected to a downwardly extending stem portion protruding a distance past a discharge opening. The sealing portion includes a first component and a second component that are adjustable relative to each other in order to define an overall static dimension of the sealing portion. A spring biases the first and second components away from each other while permitting the first and second components to be compressible relative to each other in response to movement of the actuator by the animal to provide the first and second components with a corresponding combined overall dynamic dimension that is less than the combined overall static dimension.

20 Claims, 6 Drawing Sheets

(56) References Cited

U.S. PATENT DOCUMENTS

| | | |
|---|---|---|
| 4,799,455 A | 1/1989 | O'Kelley |
| 4,949,677 A | 8/1990 | Kock |
| 4,993,365 A | 2/1991 | Weerstra |
| 4,995,343 A | 2/1991 | Cole et al. |
| 5,022,347 A | 6/1991 | DenBleyker |
| 5,138,979 A | 8/1992 | Baird et al. |
| 5,778,821 A | 7/1998 | Horwood et al. |
| 5,809,934 A | 9/1998 | Gavet |
| 5,829,385 A | 11/1998 | Kaspersen |
| 5,924,678 A | 7/1999 | Olde |
| 6,053,124 A | 4/2000 | Kolbe |
| 6,101,975 A | 8/2000 | Berry et al. |
| 6,116,471 A | 9/2000 | Miller |
| 6,182,606 B1 | 2/2001 | Wells et al. |
| 6,311,640 B1 | 11/2001 | Mercado |
| 6,575,118 B1 | 6/2003 | McKee |
| 6,666,167 B1 | 12/2003 | Carlson |
| 6,868,801 B2 | 3/2005 | Rovira Badia et al. |
| 7,810,787 B2 * | 10/2010 | Johnson .................. A01K 7/06 119/72.5 |
| 8,596,218 B2 | 12/2013 | Brumbaugh et al. |
| 2005/0066907 A1 * | 3/2005 | Pollock ............. A01K 39/0213 119/72.5 |
| 2007/0289539 A1 | 12/2007 | Berry et al. |
| 2008/0185401 A1 | 8/2008 | Luchinger |
| 2012/0216749 A1 | 8/2012 | Brumbaugh et al. |

FOREIGN PATENT DOCUMENTS

| | | |
|---|---|---|
| FR | 2946836 A1 | 12/2010 |
| GB | 2240160 A | 7/1991 |
| NL | 9401206 A | 3/1996 |
| WO | WO-95/19104 A1 | 7/1995 |

OTHER PUBLICATIONS

International Search Report and Written Opinion of the International Searching Authority mailed Jun. 21, 2012, in corresponding PCT/US2012/023734 application.
Automated Production Systems: INTaK Ad-Lib Lactation Feeding System; http://www.automatedproduction.com/English/swine/feeding/intak.html (1 of 2) [Jan. 13, 2011 15:32:42]; The Original Berry Feeder, U.S. Pat. No. 6,101,975.

* cited by examiner

SOW LACTATION FEEDER WITH ADJUSTABLE ACTUATOR

FIELD

The present disclosure generally relates to a mechanism and device for the storage and on-demand dispensing of feed to animals, and its related methods of use.

BACKGROUND

This section provides background information related to the present disclosure which is not necessarily prior art.

In the conventional raising of farm animals, various methods have been used in attempts at improved feeding. Certain animals, such as breeding, nursing, and young animals, may have specialized feeding requirements and other needs. Particular needs may be different between animals, whether it is the quantity of food delivered, the number of feedings per day, the appropriate timing of feedings, and the like. For example, it may be desired to allow lactating animals, such as sows, to feed on-demand throughout the day, while pregnant sows may only be provided with specific amounts of feed. Nursing and weaning animals, such as piglets, may have yet additional feeding requirements.

Feed that is not eaten may spoil or be rapidly contaminated and wasted by various means. Wasted feed adds further costs and, of course, is desired to be avoided. Additionally, feeding mechanisms with quality components are needed to accommodate aggressive animals. Accordingly, there remains a need for a high quality feeding mechanism that reduces waste, minimizes contamination and odor, cleans easily, and facilitates a variable supply of feed to animals as necessary.

SUMMARY

This section provides a general summary of the disclosure, and is not a comprehensive disclosure of its full scope or all of its features.

In one aspect of the present disclosure, an on-demand animal feed apparatus may comprise a receiving chamber configured to transfer animal feed from a feed supply to a feed reservoir. The receiving chamber comprises an upper section to connect to the feed supply, a lower section, and an intermediate section disposed between the upper and lower sections. A base tube is connected to the lower section of the receiving chamber. The base tube has an upper portion that cooperates with the receiving chamber to define the feed reservoir, and a lower portion defining a discharge opening for dispensing animal feed. An actuator is disposed at least partially within the base tube and configured to raise and lower in an axial direction in response to movement by an animal, thereby allowing the transfer of animal feed from the feed reservoir through the discharge opening. The actuator comprises a sealing portion disposed within the feed reservoir and connected to a downwardly extending stem portion protruding out of the base tube a distance past the discharge opening. The sealing portion comprises a first component, a second component, and an adjustment mechanism to adjust the position of the first and second components relative to each other in order to vary an overall dimension of the sealing portion.

In another aspect of the present disclosure, an on-demand animal feed apparatus may comprise a receiving chamber configured to transfer animal feed from a feed supply to a feed reservoir. The receiving chamber comprises an upper section to connect to the feed supply, a lower section, and an intermediate section disposed between the upper and lower sections. A base tube is connected to the lower section of the receiving chamber. The base tube has an upper portion that cooperates with the receiving chamber to define the feed reservoir, and a lower portion defining a discharge opening for dispensing animal feed. An actuator is disposed at least partially within the base tube and configured to raise and lower in an axial direction in response to movement by an animal, thereby allowing the transfer of animal feed from the feed reservoir through the discharge opening. The actuator comprises a sealing portion disposed within the feed reservoir and connected to a downwardly extending stem portion protruding out of the base tube a distance past the discharge opening. The sealing portion comprises a first component and a second component that have a combined overall static dimension. The first and second components are compressible relative to each other in response to movement of the actuator by the animal to provide the first and second components with a corresponding combined overall dynamic dimension that is less than the combined overall static dimension.

In yet another aspect of the present disclosure, an on-demand animal feed apparatus may comprise a receiving chamber configured to transfer animal feed from a feed supply to a feed reservoir. The receiving chamber comprises an upper section to connect to the feed supply, a lower section, and an intermediate section disposed between the upper and lower sections. A base tube is connected to the lower section of the receiving chamber. The base tube has an upper portion that cooperates with the receiving chamber to define the feed reservoir, and a lower portion defining a discharge opening for dispensing animal feed. An actuator is disposed at least partially within the base tube and configured to raise and lower in an axial direction in response to movement by an animal, thereby allowing the transfer of animal feed from the feed reservoir through the discharge opening. The actuator comprises a sealing portion disposed within the feed reservoir and connected to a downwardly extending stem portion protruding out of the base tube a distance past the discharge opening. The sealing portion comprises a first component and a second component that are adjustable relative to each other in order to define an overall static dimension of the sealing portion. A spring biases the first and second components away from each other while permitting the first and second components to be compressible relative to each other in response to movement of the actuator by the animal to provide the first and second components with a corresponding combined overall dynamic dimension that is less than the combined overall static dimension.

Further areas of applicability will become apparent from the description provided herein. The description and specific examples in this summary are intended for purposes of illustration only and are not intended to limit the scope of the present disclosure, nor to imply that any specific feature or combination of features is particularly important or required.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Numerous specific details are set forth, including examples of specific components, devices, and methods in order to provide an understanding of embodiments of the present disclosure. It will be apparent to those skilled in the art that specific details need not be employed, that example embodiments may be modified in many different ways, and that the examples should not be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures herein. Spatially relative terms may be intended to encompass different orientations of the device in use or operation in addition to the orientation depicted in the figures.

Figure 1:
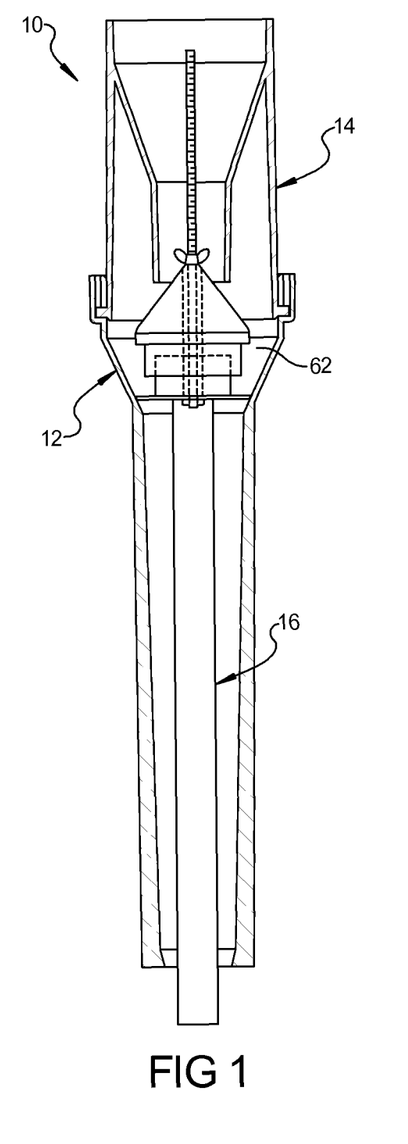
FIG. 1 is a cross-sectional view of an animal feed apparatus of the present disclosure including a side elevation view of an actuator of one exemplary embodiment.
Figure 2:
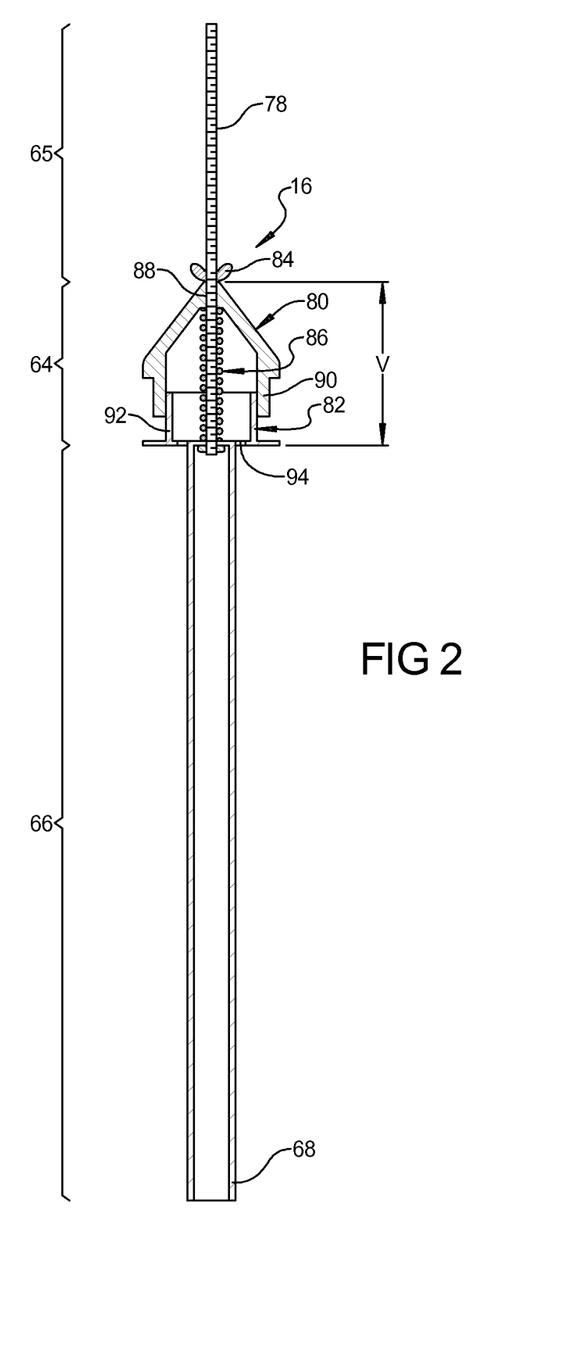
FIG. 2 is a cross-sectional view of the actuator of the animal feed apparatus of FIG. 1.

With reference to FIGS. 1 and 2, the present technology and disclosure relate to an on-demand animal feed apparatus 10 for dry particulate feeds, as well as related methods of operation. The apparatus is animal activated and gravity induced. The term "animal feed apparatus," in accordance with the present disclosure, is not intended to be limited to any particular physical configuration. As shown, the animal feed apparatus 10 may include a plurality of components, such as a base tube member 12, a receiving chamber 14, and an actuating member 16. As will be described in more detail below, preferably the animal feed apparatus 10 is designed to trickle, or dispense feed in one or more controlled amounts, for example, generally between about 0.01 and about 0.1 lbs, or between about 0.02 and about 0.05 lbs each time the apparatus is actuated. It is envisioned that in certain aspects, the feed may be also dispensed in terms of controlled volume. The term "feed" is used herein to refer to food suitable for consumption by an animal; it is intended to generically include solid materials that can be fed to any one of numerous species of animals including, without limitation, pigs, goats, sheep, cows, horses, farm animals, zoo animals, and the like. It is envisioned that various forms of feed may be used with the animal feed apparatus 10 of the present disclosure, including crumble sized feed, pellet feed, mash feed, grit feed, powder feed, and other similar types of feed commonly provided to animals.

The exemplary animal feed apparatus 10 of FIG. 1 is illustrated with a plunger-type actuator 16, and is particularly useful with pellet type feed or larger type granule feeds having a particle size with an average diameter of about 0.2 inches or greater. It is envisioned that the animal feed apparatus 10 is designed with a base tube member 12 and receiving chamber 14 that can be used with an interchangable types of actuators 16. For example, if one wants to change feed types (from pellet to mash), all that needs to be done is replace the actuator 16 for that type of feed, the base tube 12 and receiving chamber 14 stay the same.

In various aspects, the components of the animal feed apparatus 10 may be made of any of a number of types of durable, rigid plastic materials. Non-limiting examples of suitable plastics include polyvinyl chloride (PVC), polypropylene (PP), polyethylene (PE), high-density polyethylene (HDPE), and the like. If desired, the plastics may optionally be provided with various additives, fillers, colorants, and the like. In certain aspects, it may be desirable to fabricate certain components, such as the base tube, out of a clear or transparent color plastic so that one can see the interior of the feeding apparatus without having to disassemble anything. Various components may include known specially-compounded PVC, which increases resistance to ultraviolet light and resistance to wear. The components may be formed by any number of conventional plastic fabrication techniques including, but not limited to, injection molding, thermal forming, blow molding, rotational molding, and other plastics and forming techniques familiar to those skilled in the art of plastic fabrication and mass production. The animal feed apparatus 10 may also include metal or other non-plastic components as desired or necessary for strength, connection means, or other purpose.

Receiving Chamber

Figure 3:
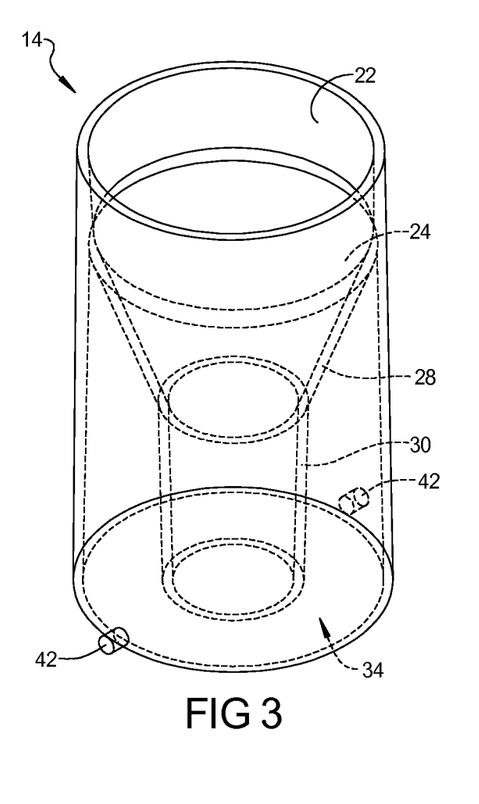
FIG. 3 is a perspective view including hidden aspects of a receiving chamber of an animal feed apparatus of the present disclosure.
Figure 4:
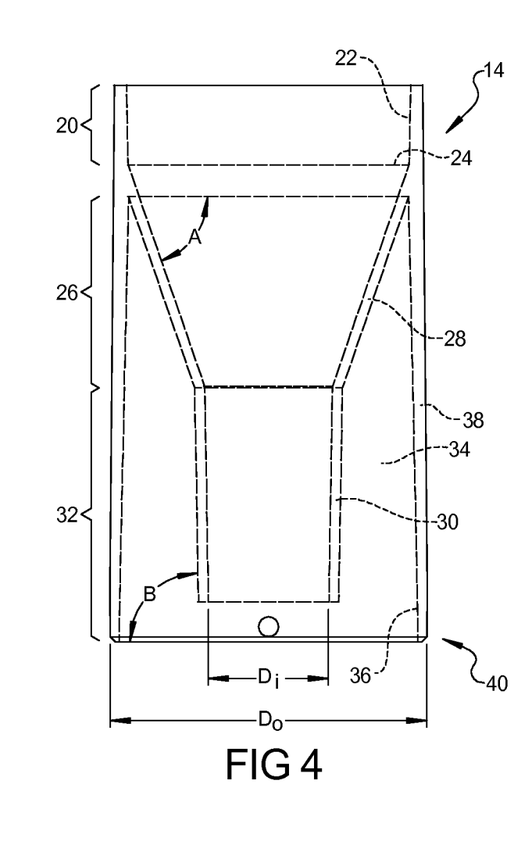
FIG. 4 is a side plan view including hidden aspects of the receiving chamber of FIG. 3.

FIG. 3 is a perspective view, including hidden aspects, of an exemplary receiving chamber, or relief cap 14, of an animal feed apparatus 10 of the present disclosure. FIG. 4 is a side plan view, including hidden elements, of the receiving chamber 14 of FIG. 3. As best shown in FIG. 4, the receiving chamber 14 may be described, in a non-limiting manner, as having three main portions, or sections. The receiving chamber 14 may be made of a single, monolithic component or may include two or more parts joined together. The upper section 20 of the receiving chamber 14 may be used to connect the animal feed apparatus 10 to a feed supply, such as an auger or feed tube (not shown). The upper section 20 is illustrated as having a generally cylindrical shape and its inner wall 22 may be provided with a slight taper or angle to allow for a slip-fit type of connection to the feed supply tube, which is typically connected to an auger-type fill system known in the art. Optional mechanical fastening means may also be provided to secure the feed supply tube to the upper section 20. The upper section 20 may be provided with an optional extending wall 24, or seat, upon which the end of an auger or feed supply tube may rest. It should be understood that the specific design of the upper section 20 is not limiting, and it may be configured to have numerous shapes to allow for an appropriate connection to a desired food supply or food source.

An intermediate section 26 is shown provided with a substantially inverted frusto-conical shaped interior wall 28 that may serve as a transition area to moderate the flow of feed from the feed supply tube area to a narrower inner delivery tube 30 portion of a lower section 32 of the receiving chamber 14. The transition area of the intermediate section 26 also serves to store a certain amount of feed prior to entry into a feed reservoir, and its ultimate dispensing to the animal. Although other potential configurations may be used, in certain cases the angle of the transition area at reference point A may be between about 70° and about 80°; preferably, the angle is about 77°. The length of this intermediate wall section may vary depending upon the ultimate feed particle size or, alternatively, may be proportional to the inner diameter of the base tube.

In certain embodiments, the inner delivery tube portion 30 of the lower section 32 may be provided with a uniform inner diameter ($D_i$). In other embodiments, however, inner delivery tube portion 30 may be provided with a slight taper, wherein the inner diameter slightly decreases from an upper portion to a lower portion of the lower section 32. Although other potential configurations may be used, in certain cases the angle at reference point B may be between about 85° and about 95°; preferably, the angle is about 89°.

The lower section 32 of the receiving chamber 14 further defines an opening for a relief area 34 between the inner delivery tube 30 and the inner surface 36 of the receiving chamber cylindrical outer wall 38. As shown, the delivery tube 30 may be concentric or substantially concentric with the receiving chamber's cylindrical outer wall 38. The relief area 34 is shown disposed between the inner delivery tube 30 and the cylindrical outer wall 38. The relief area 34 may extend from the bottom edge 40 of the receiving chamber 14 and continue up to the horizontal or angled extending wall area 24 separating the upper section 20 from the intermediate section 26. As will be described in more detail below, the relief area 34 may provide an open space for a certain amount of the feed to temporarily retreat, or displace, when an actuator is lifted, and may relieve the actuator 16 of at least some of the weight of the feed stored above it, making it easier for the animal to raise. In various aspects, the outer wall 38 of the receiving chamber 14 may be provided, for example, with a uniform thickness of about 0.125 inches, depending on the selected material and intended use, and may typically be provided with a uniform outer diameter ($D_o$). The receiving chamber 14 may also be provided with one or more protrusions 42 that can serve as a suitable anchoring mechanism for the removable connection of the receiving chamber 14 to the base tube component 12.

Base Tube

Figure 5:
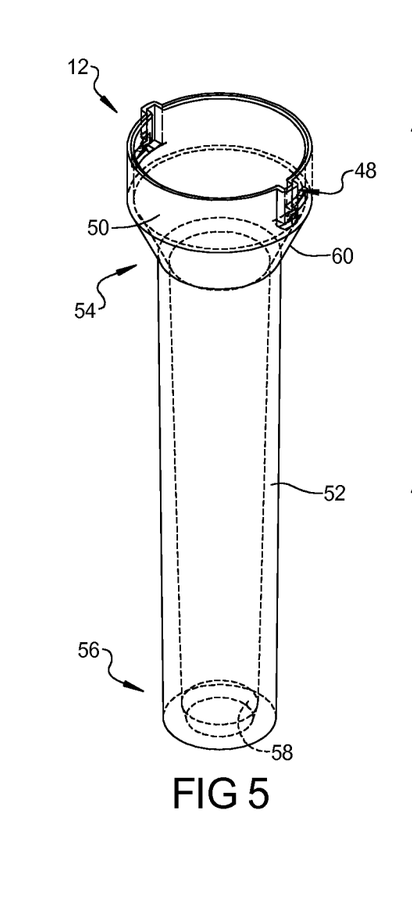
FIG. 5 is a perspective view including hidden aspects of a base tube member of an animal feed apparatus of the present disclosure.
Figures 6, 7, 8:
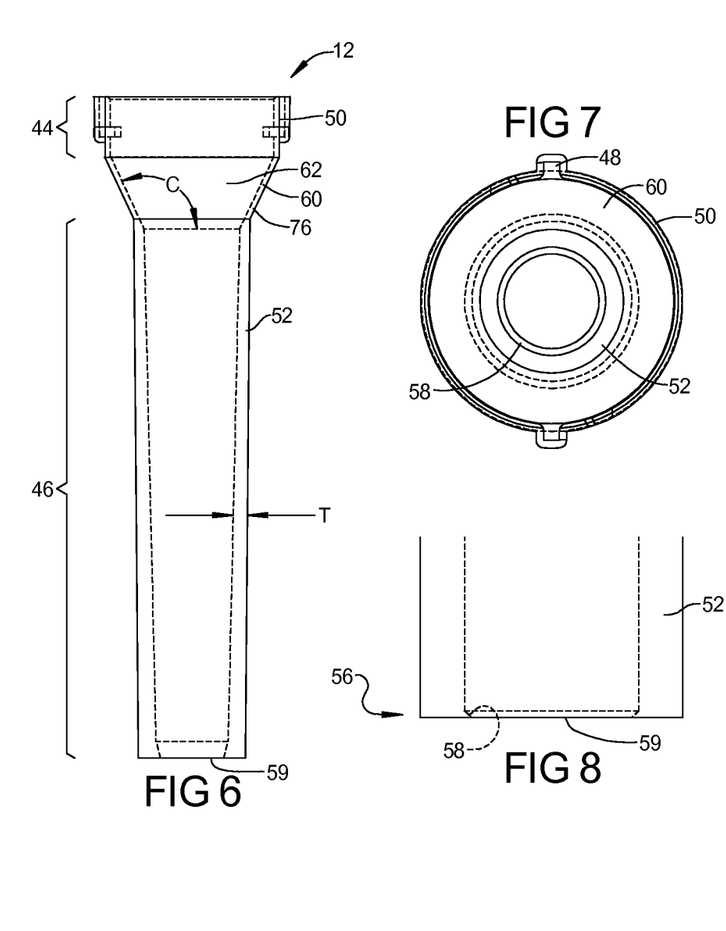
FIG. 6 is a side plan view including hidden aspects of the base tube member of FIG. 5.
FIG. 7 is a top plan view of the base tube member of FIG. 5.
FIG. 8 is a magnified partial view of the bottom portion of the base tube member of FIG. 5.

FIG. 5 is a perspective view, including hidden elements, of an exemplary base tube component 12 of an animal feed apparatus 10 of the present disclosure; FIG. 6 is a side plan view, including hidden elements, of the base tube 12 of FIG. 5. As shown, the base tube component 12 includes an upper connecting portion, or first portion 44, operable for coupling to the receiving chamber 14, and a lower tubular portion, or second portion 46, for transferring and ultimately dispensing the feed to an animal. Removable coupling of the base tube 12 and the receiving chamber 14 may be accomplished using various types of attachment or locking systems as known in the art. In the embodiment illustrated, the protrusions 42 of the receiving chamber 14 are aligned with slots 48 formed within the substantially cylindrical wall 50 of the upper connecting portion 44. Once lowered within the wall 50, the receiving chamber 14 may be rotated counterclockwise to a locking position. The removable coupling of the base tube 12 and the receiving chamber 14 allows for easy disassembly of the apparatus for cleaning, and further allows for the easy cleaning, adjustment, or replacement of the actuator 16. For example, once the receiving chamber 14 is removed, the actuator 16 can simply be inserted into (or removed from) the base tube 12 without disturbing any other components of the apparatus.

The inverted frusto-conical wall 60 of the upper connecting portion cooperates with the receiving chamber 14 to define a feed reservoir 62 as best seen in FIGS. 1 and 6. Although other potential configurations may be used, in certain cases the angle of the conical wall 60 at reference point C may be between about 110° and about 120°; preferably the angle is about 115°.

In the example embodiments illustrated in the drawings, the internal tubular wall 52 may be provided with a slight taper. For example, the base tube 12 would be provided with a tapered cylindrical cross-section, wherein the inner diameter slightly decreases from an upper end 54 to a lower end 56 of the base tube 12. The outer, exposed portion of the base tube 12 may be provided with a uniform outer diameter. Although other potential configurations may be used, in certain cases the angle of the taper may between about 0.1° and about 2°; preferably the angle is about 1.33°. In certain aspects, the length of this lower tubular portion 46 may vary, depending upon the predetermined dosage that is to be dispensed to the animal. It is envisioned that the interior shape may be decreasing cubical or pyramidal, as opposed to decreasing conical as shown. The thickness (T) of the tubular wall 52 may range between about 0.125 inches at the upper end 54 region of the base tube and about 0.5 inches at the lower end 56 of the base tube 12. In various aspects, the tubular portion 46 of the base tube 12 may be provided with a length such that the volume of the interior of the base tube 12 acts as a meter to provide a measured or readily ascertainable amount of feed during each disbursement. In certain aspects, the base tube 12 may be adjustable in length. By way of example, the base tube 12 may be made of two or more tubular portions, of various sizes, threaded or otherwise mechanically joined together.

FIG. 7 is a top plan view of the base tube 12 of FIG. 5; FIG. 8 is a magnified partial view of the bottom portion of the base tube 12. As best shown in FIG. 8, the bottom of the base tube 12 may be optionally provided with an inwardly extending sealing lip, or retaining edge 58, at the discharge opening end. Such an extending edge 58 can serve as a seat or stop mechanism to support a bobber-type actuator, as will be discussed in more detail below. It may also serve to seal the discharge opening when the bobber-type actuator is in a rest position, preventing further release of feed.

Actuator

Referring to FIGS. 1 and 2, the actuator member 16 is configured to raise and lower in response to actuation by an animal, for example, via the snout of a pig, thereby allowing the transfer of feed to trickle or flow from the feed reservoir 62 through the base tube 12 and exiting through the discharge opening 59. In various aspects, the movement of actuator 16 is generally in an axial or linear manner. In other words, rotation generally does not result in actuation that dispenses feed. In this way, moisture or contamination is less likely to enter the feed reservoir area that may otherwise lead to spoiling, or allow food to stick together and potentially blocking the passages.

The illustrated actuator 16 includes a sealing portion 64, a downwardly extending stem portion 68, and an upwardly extending elongate portion or member 65. The stem portion 68 includes a distal end portion 68 that extends downwardly past the discharge opening 59 of the base tube 12 for engagement by an animal. The elongate portion or member 65 may be comprised of a partially or fully threaded rod 78. The sealing portion 64 or body includes two components 80 and 82 that are adjustable relative to each other to select any of a plurality of possible overall vertical dimensions V of the sealing portion 64.

Figure 9:
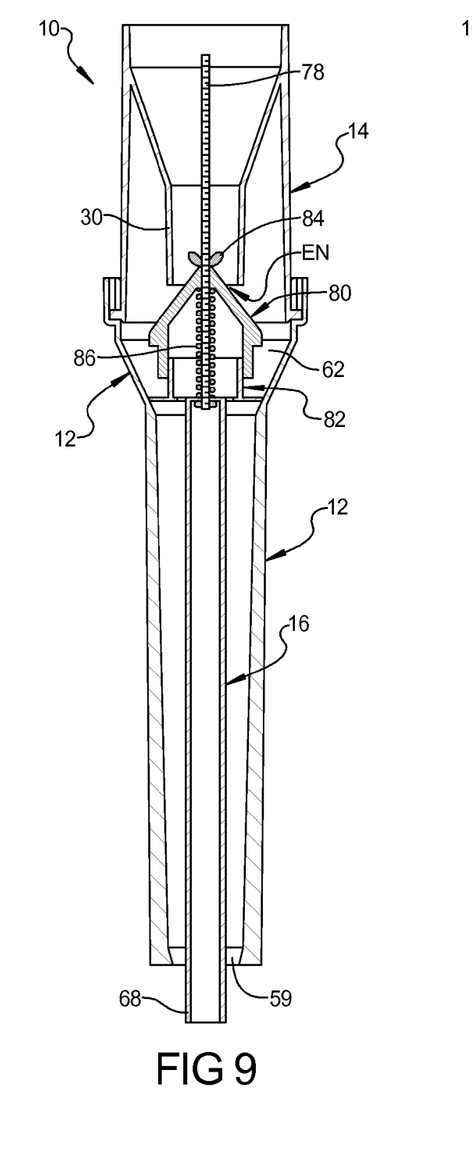
FIG. 9 is a cross-sectional view of the animal feed apparatus of FIG. 1 with the actuator in a rest position.

Adjusting the overall vertical dimension V of the sealing portion 64 may be accomplished as illustrated with a threaded rod 78 coupled to one of the two components 82 and movable relative to the other component 80. A wing nut 84 may be rotated up or down on the threaded rod 78 to select a desired overall vertical dimension V of the sealing portion 64. A spring 86 or other biasing member may bias the components 80, 82 away from each other and the first, or upper component 80 against the wing nut 84. The overall vertical dimension V to which the sealing portion 64 is adjusted as illustrated in FIG. 9 corresponds to a combined overall static dimension of the components 80 and 82.

As discussed below, the spring 86 may permit the upper component 80 to move toward the lower component 82 of the sealing portion 64. For example, the upper component may include an aperture 88 that may slide along the elongate member 78. In addition, the upper component 80 may include a downwardly extending peripheral wall 90 and the lower component 82 may include and upwardly extending peripheral wall 92. Thus, the peripheral walls 90 and 92 may provide cooperating surfaces that engage or slide along each other during collapsing, which reduces the overall vertical dimension V of the sealing member 64 as discussed herein. The overall vertical dimension V to which the sealing portion 64 is collapsed as illustrated in FIG. 9 corresponds to a combined overall dynamic dimension of the components 80 and 82.

It is possible that feed dust or moisture might enter the cavity between the first component 80 and the second component 82 through any gap between the peripheral walls 90 and 92 of the components 80, 82. Apertures 94 may be provided in the base of the lower component 82 of the sealing member to provide an exit for such feed material from an open space between the first component 80 and the second component 82 and at least partially defined by the upwardly extending vertical peripheral wall 92.

Figure 11:
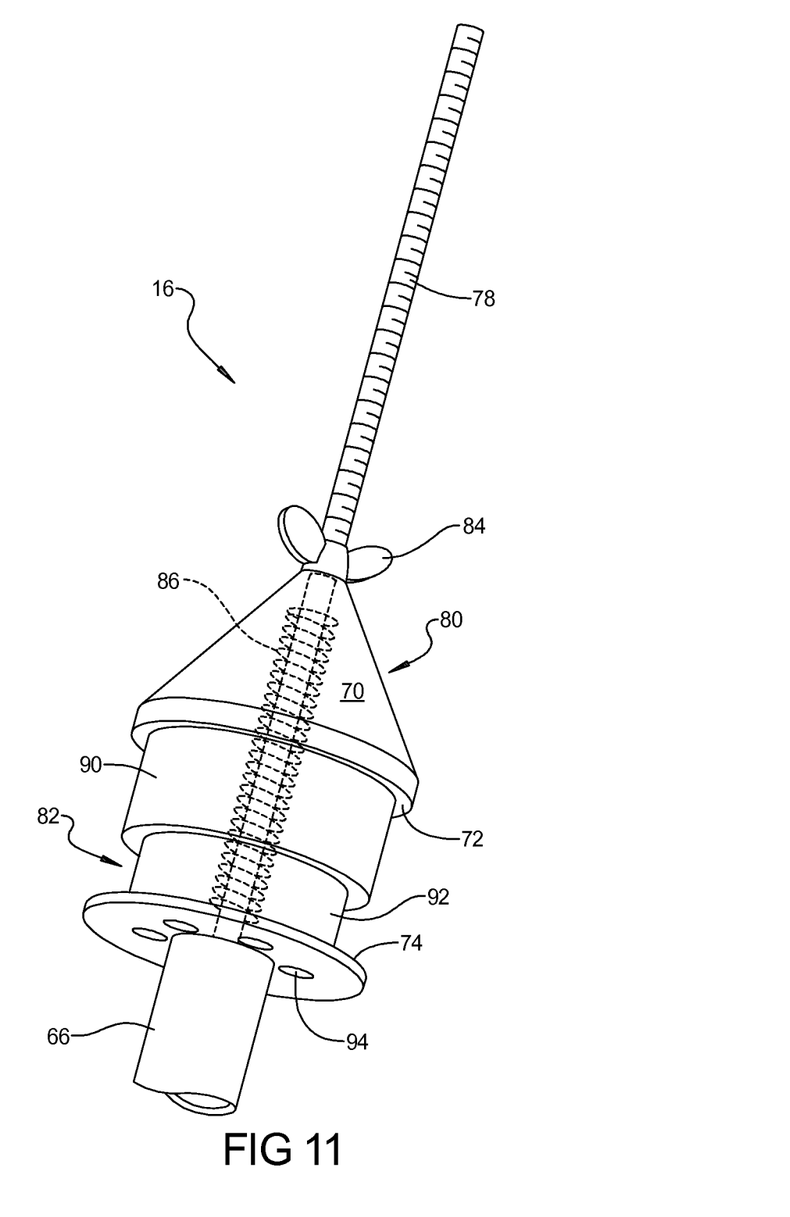
FIG. 11 is an enlarged partial perspective view of a portion of the actuator of FIG. 1.

In various embodiments, the sealing portion 64 may comprise a conical surface 70 (perhaps best seen in FIG. 11). Although other potential configurations may be used, in certain cases the angle of the conical surface 70 as indicated by reference point D may between about 50° and about 60°; preferably, the angle is about 54°. The sealing portion 64 may also be provided with one or more sealing members, or annular ribs 72, 74. In use, the plunger 16 is located in the base tube 12, wherein the lowermost annular sealing rib 74 rests and sealingly engages the opening of the tube portion as indicated by reference number 76.

The stem may extend through the entire length of base tube 52 and extends a distance past the discharge opening 59. The stem portion 66 may be a hollow tube, connected to the sealing portion 64 at one end with the actuating portion 68 at the opposite end. The sealing portion 64 is located within the feed reservoir 62 and is operable to move in an axial direction between the bottom of the delivery tube 30 of the receiving chamber 14 and the top of the tube opening 76 of the base tube 12.

Figure 10:
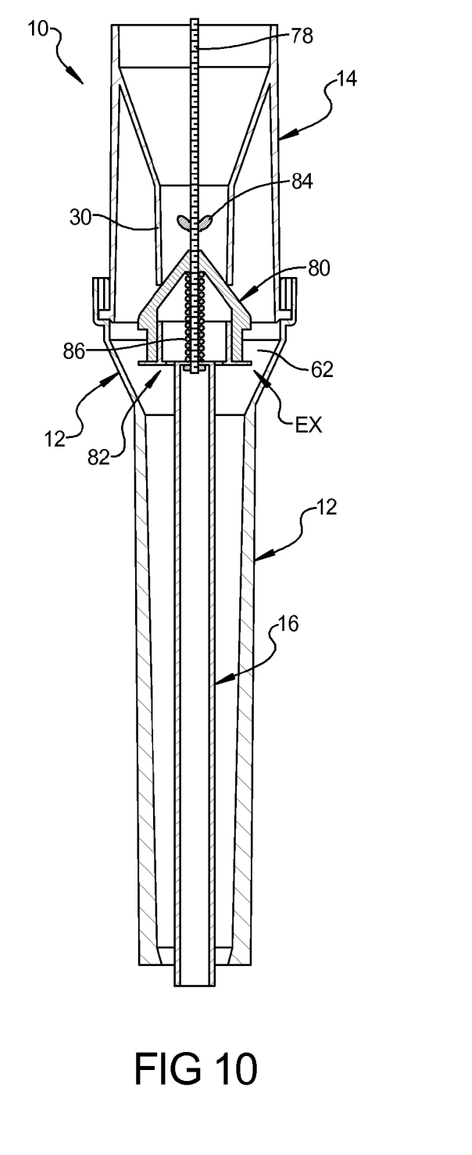
FIG. 10 is cross-sectional view similar to FIG. 9, but with the actuator in a fully actuated position.

Actuation of the illustrated embodiment is described with reference to FIGS. 9 and 10. In the lower, or static position of FIG. 9, sealing rib 74 engages against the top of the tube opening 76 of the base tube 12. A dose of feed may pass through the entry gap EN between the conical surface 70 of the sealing portion 64 of plunger 16 and the lower distal end of inner delivery tube 30 to enter the feed reservoir 62. As should be appreciated, adjustment of the overall vertical height V of the sealing portion 64 affects the size of the entry gap EN.

Adjustment of the entry gap EN may be desired to accommodate different types or sizes of feed, the amount of feed that is dosed during actuation, the speed at which the feed is dosed, or a combination of these. In one example, the size of the entry gap EN may be reduced for a particularly active animal that repeatedly actuates the actuator 16 allowing unwanted feed to fall on the ground where it goes uneaten and is wasted. By slowing the rate at which feed enters the feed reservoir 62 or amount of feed that is dosed into the feed reservoir, such an animal may lose interest in actuating the device unless or until it is truly hungry enough to eat what is dispensed.

Conversely, large sized feed may be used, making a very large entry gap EN desirable. In some instances, the feed chamber 62 may be designed such that the sealing portion 64 does not come into contact with the inner delivery tube 30 during actuation at all, even when in a fully raised position due to axial movement of the actuator by the animal. It is often the case, however, that a large exit gap EX is also desired with such large feed, which may make it desirable for the sealing portion 64 to collapse to increase the size of the exit gap EX as discussed below.

The plunger 16 is raised during actuation by the animal and the upper surface 70 of the upper component 80 of the sealing portion 64 may contact against the distal end of the inner delivery tube 30. In this position, an exit gap EX is formed between the sealing rib 74 and the top of the tube opening 76 of the base tube 12. In some cases, the exit gap EX in this position may be sufficient or desired. For example, if small sized feed is being used, or there is a desire to slow the exit of feed from the dispenser to discourage over-actuation by a particularly active animal. In such cases, it may be desire to prevent or limit the movement of the first component 80 of the sealing portion 64 toward the second component 82. Preventing collapsing movement may be accomplished by replacing the spring 86 with a threaded member (not shown), while limiting collapsing movement may be accomplished with a threaded member and spring combination.

In other cases, it may be desired to increase the exit gap EX by allowing the second component 82 to continue to move toward the first component 80 as a result of continued actuation by the animal. In such cases, continued actuation by the animal compresses the spring 86, reducing the overall vertical dimension V of the sealing portion 64 and increasing the size of the exit gap EX between the sealing rib 74 and the tube opening 76 of the base tube 12. As the animal releases the plunger 16, the overall vertical dimension V of the sealing portion returns to its static dimension against the wing nut 84.

The strength of the biasing force provided by the spring 86 may be selected to be more or less difficult for the animal to compress the sealing portion 64 and reduce its overall vertical dimension V by continued movement of the second component 82 upwardly toward the first component 80. Again, for a particularly active animal, a higher biasing force might be desired in order to discourage non-hunger-related actuations or to slow the passage of feed through the exit gap EX.

Of course, a predetermined dose of feed may be allowed to pass from the feed reservoir 62 and to trickle around the sealing portion 64 through the exit gap EX, and be transferred down the base tube out the discharge opening 59 to the animal. During upward axial movement of the plunger 16, a certain amount of feed may also be permitted to temporarily move within the relief gap area 34 as described above.

As noted previously, the elongate member 78 extends upwardly from the sealing portion 64 of plunger 16. As such, it extends into at least the lower section 32, and may extend into the intermediate section 26, and may even continue into the upper section 20, including a feed supply (not shown). During actuation, the resulting reciprocating movement of the elongate member 78 may operate to help break up any feed clogs within portions of the receiving chamber 14 into which it extends.

The present disclosure also provides a method for providing on-demand feed to an animal. The method may comprise coupling a receiving chamber and a tapered base tube that cooperate to define a feed reservoir. The method may include providing an adjustable actuator member disposed at least partially within the base tube and configured to raise and lower in an axial direction. Animal feed may be transferred from a feed source to a feed reservoir, and the animal may be allowed to control the movement of the actuator member for on-demand discharge of a predetermined dosage of feed from the feed reservoir. In various aspects, the method includes providing a relief area in fluid communication with the feed reservoir allowing for the temporary displacement of a resultant portion of feed in the feed reservoir that is moved as a result of axial actuator movement.

Disclosed methods may include providing an adjustable sealing member and plunger, and adjusting an overall vertical static dimension of the sealing portion as described herein. Disclosed methods may include providing a sealing member that is collapsible during actuation between an overall vertical static dimension and an overall vertical dynamic dimension, and collapsing the sealing member as described herein. Disclosed methods may include providing the plunger with an elongate member extending upwardly from the sealing member and into the receiving chamber, and actuating such a plunger as described herein. Disclosed methods may also include providing apertures in a lower portion of the sealing member of the plunger to allow any feed or moisture that has migrated into the interior to exit the sealing member as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable or combinable with any combination of additional elements or features in a selected embodiment, even if not specifically shown or described. The same may also be varied in many ways. Such variations are not to be regarded as a departure from the disclosure, and all such modifications are intended to be included within the scope of the disclosure.

What is claimed is:

1. An on-demand animal feed apparatus comprising:
    a receiving chamber configured to transfer animal feed from a feed supply to a feed reservoir, the receiving chamber comprising an upper section to connect to the feed supply, a lower section, and an intermediate section disposed between the upper and lower sections;
    a base tube connected to the lower section of the receiving chamber, the base tube having an upper portion that cooperates with the receiving chamber to define the feed reservoir, and a lower portion defining a discharge opening for dispensing animal feed; and
    an actuator disposed at least partially within the base tube and configured to raise and lower in an axial direction in response to movement by an animal, thereby allowing the on-demand transfer of animal feed from the feed reservoir through the discharge opening;
    wherein the actuator comprises a sealing portion disposed within the feed reservoir and connected to a downwardly extending stem portion protruding out of the base tube a distance past the discharge opening; and
    wherein the sealing portion comprises a first component, a second component, and an adjustment mechanism to adjust the position of the first and second components relative to each other in order to vary an overall dimension of the sealing portion.

2. The animal feed apparatus of claim 1, wherein the adjustment mechanism comprises a threaded member supporting a threaded fastener rotatable to adjust the overall dimension of the sealing portion.

3. The animal feed apparatus of claim 2, wherein the threaded fastener comprises a wing nut.

4. The animal feed apparatus of claim 2, wherein the threaded member comprises an elongate member extending upwardly from the sealing portion at least into the upper section of the receiving chamber.

5. The animal feed apparatus of claim 1, wherein the first component comprises a downwardly extending vertical peripheral wall, and the second component comprises an upwardly extending vertical peripheral wall configured to slide against each other when the first component is adjusted relative to each other.

6. The animal feed apparatus of claim 5, wherein the second component comprises vertical apertures providing an exit for feed material from an open space between the first and second components and at least partially defined by the upwardly extending vertical peripheral wall.

7. An on-demand animal feed apparatus comprising:
    a receiving chamber configured to transfer animal feed from a feed supply to a feed reservoir, the receiving chamber comprising an upper section to connect to the feed supply, a lower section, and an intermediate section disposed between the upper and lower sections;
    a base tube connected to the lower section of the receiving chamber, the base tube having an upper portion that cooperates with the receiving chamber to define the feed reservoir, and a lower portion defining a discharge opening for dispensing animal feed; and an actuator disposed at least partially within the base tube and configured to raise and lower in an axial direction in response to movement by an animal, thereby allowing the on-demand transfer of animal feed from the feed reservoir through the discharge opening;

wherein the actuator comprises a sealing portion disposed within the feed reservoir and connected to a downwardly extending stem portion protruding out of the base tube a distance past the discharge opening; and wherein the sealing portion comprises a first component and a second component that have a combined overall static dimension, and the first and second components are compressible relative to each other in response to movement of the actuator by the animal to provide the first and second components with a corresponding combined overall dynamic dimension that is less than the combined overall static dimension.

8. The animal feed apparatus of claim 7, wherein a spring biases the first and second components away from each other toward a static relational position corresponding to the combined overall static dimension of the sealing portion.

9. The animal feed apparatus of claim 8, wherein, in response to movement of the actuator by the animal, the spring permits the first and second components to move toward each other and toward a dynamic relational position corresponding to the combined overall dynamic dimension of the sealing portion.

10. The animal feed apparatus of claim 7, wherein the actuator further comprises an elongate member extending upwardly from the sealing portion at least into the upper section of the receiving chamber.

11. The animal feed apparatus of claim 10, wherein the elongate member is a threaded rod supporting a threaded fastener rotatable to adjust the overall dimension of the sealing portion.

12. The animal feed apparatus of claim 7, wherein an elongate member extends between the first and second components and upon which a spring member is mounted that biases the first and second components away from each other toward a static relational position corresponding to the combined overall static dimension of the sealing portion, and in response to movement of the actuator by the animal, the spring permits the first and second components to move toward each other and toward a dynamic relational position corresponding to the combined overall dynamic dimension of the sealing portion.

13. The animal feed apparatus of claim 7, wherein the first component comprises a downwardly extending vertical peripheral wall, and the second component comprises an upwardly extending vertical peripheral wall configured to slide against each other when the first component is adjusted relative to each other.

14. The animal feed apparatus of claim 7, wherein the second component comprises vertical apertures providing an exit for feed material from an open space between the first and second components and at least partially defined by the upwardly extending vertical peripheral wall.

15. An on-demand animal feed apparatus comprising:
a receiving chamber configured to transfer animal feed from a feed supply to a feed reservoir, the receiving chamber comprising an upper section to connect to the feed supply, a lower section, and an intermediate section disposed between the upper and lower sections;

a base tube connected to the lower section of the receiving chamber, the base tube having an upper portion that cooperates with the receiving chamber to define the feed reservoir, and a lower portion defining a discharge opening for dispensing animal feed; and an actuator disposed at least partially within the base tube and configured to raise and lower in an axial direction in response to movement by an animal, thereby allowing the on-demand transfer of animal feed from the feed reservoir through the discharge opening;

wherein the actuator comprises a sealing portion disposed within the feed reservoir and connected to a downwardly extending stem portion protruding out of the base tube a distance past the discharge opening; and wherein the sealing portion comprises a first component and a second component that are adjustable relative to each other in order to define an overall static dimension of the sealing portion; and wherein a spring biases the first and second components away from each other while permitting the first and second components to be compressible relative to each other in response to movement of the actuator by the animal to provide the first and second components with a corresponding combined overall dynamic dimension that is less than the combined overall static dimension.

16. The animal feed apparatus of claim 15, wherein the actuator comprises an elongate member extending upwardly from the sealing portion and into the receiving chamber, and wherein the adjustment mechanism comprises a threaded portion of the elongate member supporting a threaded fastener rotatable to adjust the overall static dimension of the sealing portion, and wherein the spring member is mounted on the elongate member.

17. The animal feed apparatus of claim 16, wherein the threaded fastener comprises a wing nut.

18. The animal feed apparatus of claim 15, wherein the lower section of the receiving chamber defines a relief area for the temporary displacement of animal feed when the actuator is raised or lowered.

19. The animal feed apparatus of claim 15, wherein the first component comprises a generally conical upper outer surface and a downwardly extending vertical peripheral wall, and the second component comprises an upwardly extending vertical peripheral wall configured to slide against each other when the first component is adjusted relative to each other.

20. The animal feed apparatus of claim 19, wherein the second component comprises vertical apertures providing an exit for feed material from an open space between the first and second components and at least partially defined by the upwardly extending vertical peripheral wall.

* * * * *